(12) United States Patent
Migita et al.

(10) Patent No.: US 11,387,966 B2
(45) Date of Patent: Jul. 12, 2022

(54) INFORMATION TRANSMISSION CONTROL DEVICE, SERVER, AND INFORMATION TRANSMISSION CONTROL SYSTEM

(71) Applicant: Mitsubishi Electric Corporation, Tokyo (JP)

(72) Inventors: Kyohei Migita, Tokyo (JP); Teruko Fujii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/112,409

(22) Filed: Dec. 4, 2020

(65) Prior Publication Data

US 2021/0091911 A1 Mar. 25, 2021

Related U.S. Application Data

(63) Continuation of application No. PCT/JP2018/025335, filed on Jul. 4, 2018.

(51) Int. Cl.
*H04L 5/00* (2006.01)
*H04W 76/20* (2018.01)
(Continued)

(52) U.S. Cl.
CPC .......... *H04L 5/0064* (2013.01); *H04L 5/0069* (2013.01); *H04L 5/0098* (2013.01);
(Continued)

(58) Field of Classification Search
CPC ... H04L 5/0064; H04L 5/0069; H04L 5/0098; H04W 4/40; H04W 72/048; H04W 76/20;
(Continued)

(56) References Cited

U.S. PATENT DOCUMENTS 10,068,470 B2 * 9/2018 Pundurs ............... G08G 1/0129
2007/0150185 A1 * 6/2007 Nagase .................. G01C 21/30
701/422
2018/0225962 A1 * 8/2018 Nakamura ........... G08G 1/0133

FOREIGN PATENT DOCUMENTS

CN 110942642 B * 1/2021
EP 3343532 A1 * 7/2018 ............... G08G 1/01
(Continued)

OTHER PUBLICATIONS

International Search Report for PCT/JP2018/025335 dated Sep. 25, 2018.
(Continued)

*Primary Examiner* — Wutchung Chu
(74) *Attorney, Agent, or Firm* — Birch, Stewart, Kolasch & Birch, LLP

(57) ABSTRACT

The information transmission control device according to the present disclosure is for controlling a position to start transmitting probe data to a server; the information transmission control device uses a vehicle's current lane segment information and history information about the vehicle's having transmitted probe data, to set a transmission interval distance and an offset for changing a position to start transmitting probe data. By using the transmission interval distances and the offsets, transmission start positions to transmit probe data are shifted on a running unit basis or on a vehicle basis. Therefore, while the vehicle stops, multiple data transmission at the same position does not occur. This can reduce the communication cost, and makes it possible to obtain information evenly on the travel route.

8 Claims, 16 Drawing Sheets

(51) Int. Cl.
*H04W 4/40* (2018.01)
*H04W 72/04* (2009.01)

(52) U.S. Cl.
CPC ........... *H04W 4/40* (2018.02); *H04W 72/048* (2013.01); *H04W 76/20* (2018.02)

(58) Field of Classification Search
CPC ..... H04W 4/029; H04W 4/44; H04W 72/121; H04W 52/343; H04W 72/005; G08G 1/00; G08G 1/09; G08G 1/065; G08G 1/01; G08G 1/0112; G08G 1/0125; G08G 1/0133; G08G 1/0141; G08G 1/127; G08G 1/13; G08G 1/096716; G08G 1/164; G08G 1/20; H04B 1/00; H04B 7/24; H04B 7/26; H04J 3/1694
See application file for complete search history.

(56) References Cited

FOREIGN PATENT DOCUMENTS

| | | |
|---|---|---|
| JP | 2008-77143 A | 4/2008 |
| JP | 2013-225201 A | 10/2013 |
| JP | 2017-45129 A | 3/2017 |
| WO | WO 2017/037784 A1 | 3/2017 |
| WO | WO-2017037784 A1 * | 3/2017 ............... G08G 1/01 |
| WO | WO-2020008554 A1 * | 1/2020 ........... H04L 5/0064 |

OTHER PUBLICATIONS

Japanese Notice of Reasons for Refusal, issued in JP Application No. 2020-528593 dated Jul. 7, 2020, corresponding to International application No. PCT/JP2018/025335.

* cited by examiner

Fig. 8

■ Example of probe data transmission history information

| Lane segment ID | Last travel date and time | Number of travels |
|---|---|---|
| 100010 | 2018/4/4 | 231 |
| 100023 | 2018/4/4 | 231 |
| 100041 | 2018/3/28 | 29 |
| ... | ... | ... |

■ Setting Example : transmission interval distance and offset

Reference transmission interval distance: A meters (for example, 10 meters)

Random number table for offset

| Number of travels | Offset |
|---|---|
| 0 | 7 |
| 1 | 70 |
| 2 | 8 |
| 3 | 83 |
| 4 | 67 |
| 5 | 63 |
| 6 | 45 |
| ... | ... |

Transmission interval distance is determined based on elapsed time from last travel date and time:
- Less than 7 days    A × 10 meters
- Less than 30 days   A × 5 meters
- Less than one year  A × 2 meters
- One year or more    A meters Offset is determined based on random number table:
- When number of travels = 0, offset = 7 meters
- When number of travels = 1, offset = 70 meters

INFORMATION TRANSMISSION CONTROL DEVICE, SERVER, AND INFORMATION TRANSMISSION CONTROL SYSTEM

CROSS REFERENCE TO RELATED APPLICATION

This application is a Continuation of PCT International Application No. PCT/JP2018/025335, filed on Jul. 4, 2018, which is hereby expressly incorporated by reference into the present application.

TECHNICAL FIELD

The present disclosure relates to an information transmission control device that controls the position at which probe data is transmitted to a server.

BACKGROUND ART

In recent years, a technology to update lane-level high-precision maps (dynamic maps) by using probe data has been developed for realizing automatic driving functions and the like. The information required for the technology to update the high-precision maps often includes data dependent on the vehicle locations; therefore, for example, a communication device for uploading the vehicle information autonomously selects a transmission interval of probe data or a communication speed for transmitting probe data according to individual situations of the vehicle such as the traveling speed of the vehicle, to normalize the communication load for transmitting probe data and the processing load at the destination device (for example, Patent Document 1).

Patent Document 1: Unexamined Patent Application Publication JP, 2017-045129, A

SUMMARY OF THE INVENTION

Problems to be Solved by the Invention

However, the normalization technique applied, in for example Patent Document 1, to adjust only its transmission rate or communication speed causes a communication cost increase due to transmitting the same position data multiple times while the vehicle stops, and also brings a difficulty in obtaining information evenly for each location (on roads). The present disclosure is made to solve the above-mentioned problems. A specific distance traveled by the vehicle is used for probe data transmission interval, and positions to start transmitting probe data (hereinafter, each referred to as a transmission start position) are shifted for each running unit or for each vehicle. As a result, the communication load is reduced and information at positions on the road is obtained efficiently and evenly.

Solution to Problems

An information transmission control device according to the present disclosure includes: a transceiver unit to receive current lane segment information including specific information of a lane segment of a lane for a vehicle to travel along and a distance thereof from a head position of the lane segment; and a control unit to control transmission of probe data by setting a second transmission start positon, on the basis of a transmission interval distance showing a transmission interval represented in terms of travel distance for transmitting probe data from the vehicle to a server and on the basis of an offset for changing a first transmission start position to transmit the probe data to the server, the transmission interval distance and the offset being set using the current lane segment information and history information about probe data transmission from the vehicle to the server.

Advantages of the Invention

The information transmission control device according to the present disclosure sets a transmission interval distance and an offset using current lane segment information and history information about having transmitted probe data to the server, and uses the transmission interval distance and the offset to shift the transmission start position to transmit probe data. This ensures that data at the same position is not transmitted multiple times while the vehicle stops. Therefore, the communication cost can be reduced, and the information along the travel route can be obtained evenly.

BRIEF DESCRIPTION OF DRAWINGS

FIG. 8 shows setting examples of a transmission interval distance and an offset according to Embodiment 1 of the present disclosure.

EMBODIMENTS

Figure 1:
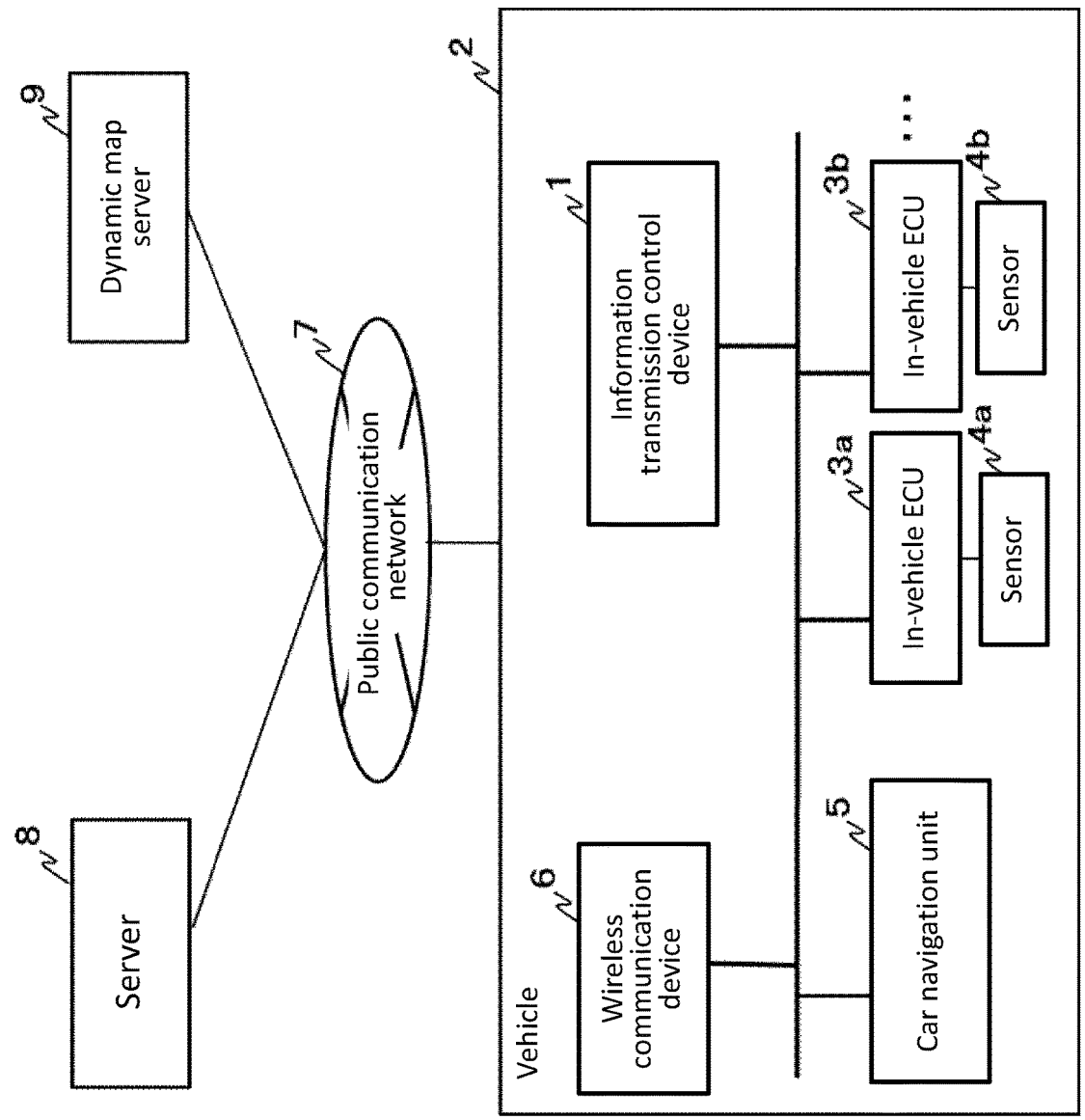
FIG. 1 is a system configuration diagram including an information transmission control device 1 according to Embodiment 1 of the present disclosure.

Embodiments of an information transmission control device according to the present disclosure will be described in detail below with reference to the drawings. In the drawings, the same or equivalent parts are marked with the same symbols. In the description of the embodiments, explanation on the same or equivalent parts will be appropriately omitted or simplified.
These embodiments do not limit the scope of the present disclosure.

Embodiment 1

FIG. 1 is a system configuration diagram including an information transmission control device 1 according to Embodiment 1 of the present disclosure. In FIG. 1, the information transmission control device 1 of the present disclosure is mounted on a vehicle 2. The vehicle 2 also includes a plurality of in-vehicle electronic control units 3 (ECUs) and sensors 4 connected to the respective in-vehicle ECUs 3, and a car navigation unit 5, and a wireless communication device 6. The vehicle 2 communicates with the server 8 and a dynamic map server 9 via a public communication network 7. The vehicle 2 transmits probe data to the server 8. The dynamic map server 9 provides the vehicle 2 with map information.

Next, the devices mounted on the vehicle 2 will be individually described. The in-vehicle ECUs 3 of the vehicle 2 provide the information transmission control device 1 with probe data including the vehicle's traveling information such as the vehicle's speed, acceleration, and steering information measured by the sensors 4. The information transmission control device 1 controls positions to transmit this probe data to the server 8, to transmit the probe data. The information transmission control device 1 will be described in detail later. The sensors 4 are connected to their respective in-vehicle ECUs 3 and measure traveling conditions of the vehicle 2 to send the measured data to their in-vehicle ECUs 3.

The car navigation unit 5 receives information including the latest map information and congestion information on a lane basis from the dynamic map server 9, and determines a travel route to the destination on a lane basis. Then, the car navigation unit sends the present lane segment information (hereinafter, referred to as current lane segment information) extracted from the travel route, to the information transmission control device 1. A lane segment corresponds to a section which is defined by dividing each lane constituting a road on a basis of a predetermined criterion. The lane segment information includes a lane segment identification (ID) and information of a distance from a head position of the lane segment. Thus, the current lane segment information includes the lane segment ID of a lane segment where the vehicle is going to travel first or the vehicle is traveling from among the lane segment IDs of the travel route determined by the car navigation unit 5, and includes the distance to the vehicle from the head positon of the lane segment.

In addition, the current position of the vehicle 2 is determined by the global navigation satellite system (GNSS) and the determined current position is outputted to the information transmission control device 1.

Through the public communication network 7, the wireless communication device 6 performs wireless communication between the vehicle 2 and the server 8, and performs wireless communication between the vehicle 2 and the dynamic map server 9. The above is the description of the in-vehicle devices of the vehicle 2.

Next, the configuration of the information transmission control device 1 and the server 8 will be described in detail.

Figure 2:
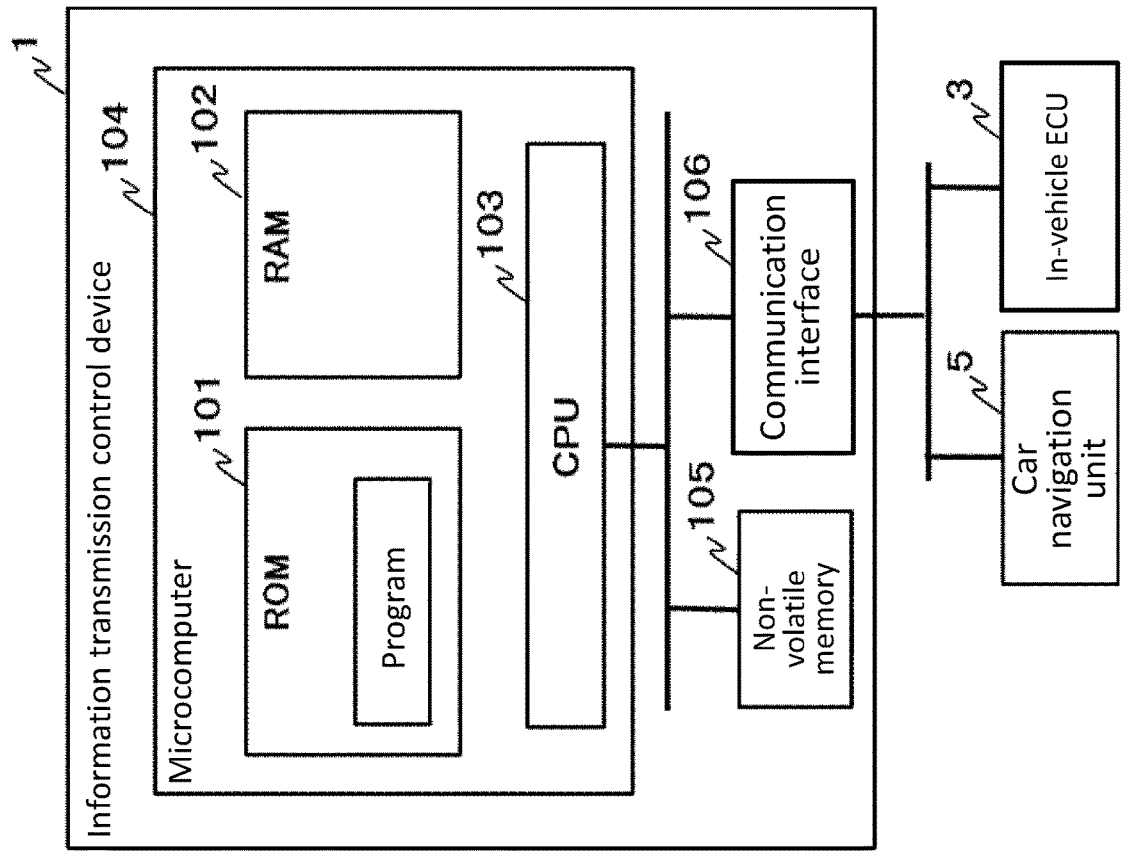
FIG. 2 is a hardware configuration diagram of the information transmission control device 1 according to Embodiment 1 of the present disclosure.

First, the hardware configurations of the information transmission control device 1 and the server 8 will be described. FIG. 2 is a hardware configuration diagram of the information transmission control device 1 according to Embodiment 1 of the present disclosure. The information transmission control device 1 includes, as its major components, a microcomputer 104, a non-volatile memory 105, and a communication interface 106. The microcomputer includes a read-only memory (ROM) 101, a random access memory (RAM) 102, and a central processing unit (CPU) 103. The communication interface 106 communicates with each device mounted on the vehicle 2.

Figure 3:
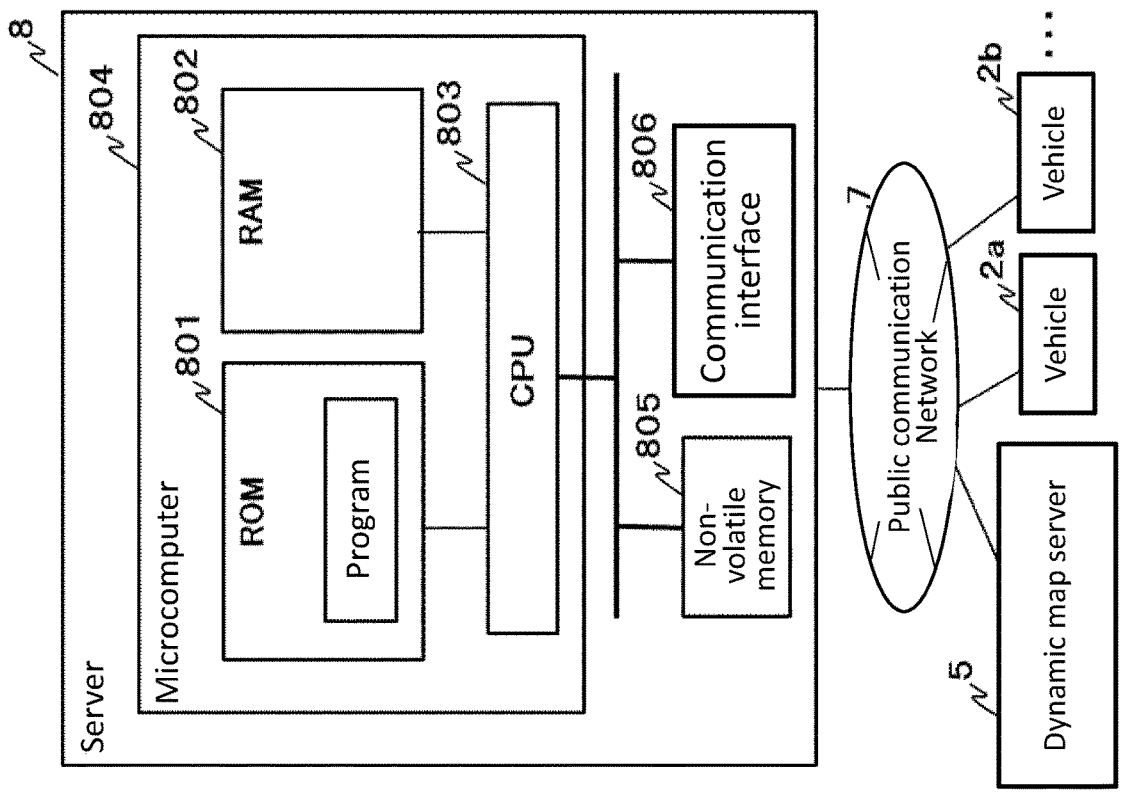
FIG. 3 is a hardware configuration diagram of a server 8 according to Embodiment 1 of the present disclosure.

FIG. 3 is a hardware configuration diagram of the server 8 according to Embodiment 1 of the present disclosure. The server 8 includes a microcomputer 804, a non-volatile memory 805, and a communication interface 806. The microcomputer 804 includes a ROM 801, a RAM 802, and a CPU 803. The communication interface 806 communicates with the vehicle 2.

Figure 4:
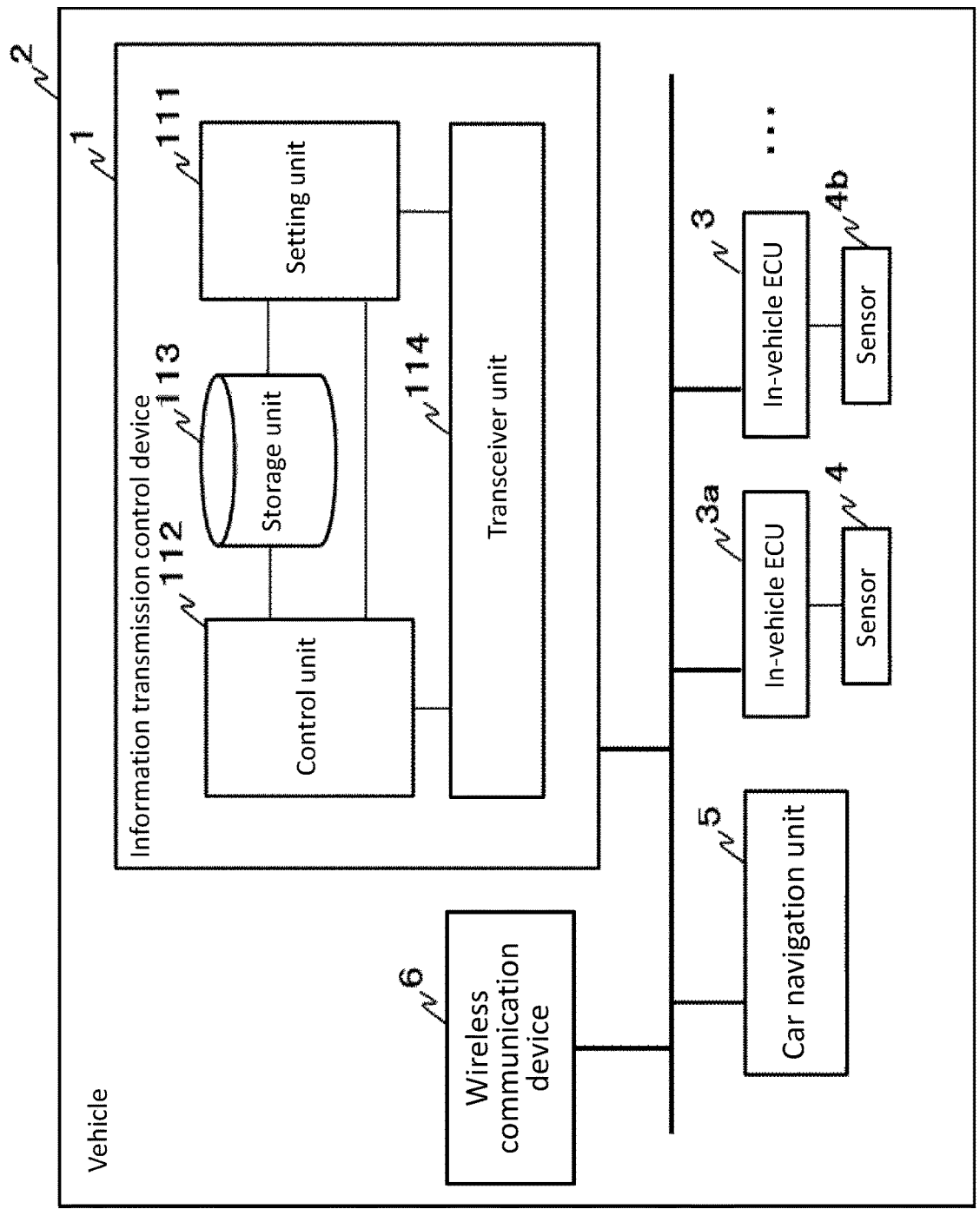
FIG. 4 is a functional configuration diagram of the information transmission control device 1 according to Embodiment 1 of the present disclosure.

Next, the functional configuration of the information transmission control device 1 will be described. FIG. 4 is a functional configuration diagram of the information transmission control device 1 according to Embodiment 1 of the present disclosure. In FIG. 4, the information transmission control device 1 includes a setting unit 111, a control unit 112, a storage unit 113, and a transceiver unit 114; the setting unit 111 is for changing a transmission start position being a position to start transmitting probe data to the server 8 and sets a distance of transmission interval (hereinafter, referred to as a transmission interval distance) and an offset; the control unit 112 controls data transmission so that probe data will be transmitted to the server 8 at a transmission position changed by using the set transmission interval distance and the set offset; the storage unit 113 stores information on transmission history of probe data; and the transceiver unit 114 transmits data to and receives data from other in-vehicle devices of the vehicle 2.

The transmission interval distance is an interval which is represented in terms of travel distance for transmitting probe data from the vehicle 2 to the server 8. The offset is a value which is for changing the position to start transmitting the probe data to the server 8 for the first time from the head positon of the current lane segment and which is for changing the transmission start position from a first transmission start position determined by the transmission interval distance to a second transmission start position. The CPU 103 reads and executes a program stored in the ROM 101 shown in FIG. 2 to perform the processing of the setting unit 111 and that of the control unit 112. The communication interface 106 performs the processing of the transceiver unit 114. The storage unit 113 corresponds to the RAM 102.

Next, the components of the information transmission control device 1 will be described individually. The setting unit 111 uses the current lane segment information received from the car navigation unit 5 and the probe data transmission history information recorded in the storage unit 113, to set a transmission interval distance and an offset. Then, the setting unit outputs the set transmission interval distance and the set offset to the control unit 112. The processing of the setting unit 111 corresponds to a setting step.

The control unit 112 uses the transmission interval distance and the offset inputted from the setting unit 111, to change the transmission start position, at which the probe data is to be transmitted to the server 8, and set the transmission start position to a second transmission start position. Then, the control unit 112 performs control operations so as to obtain probe data from the in-vehicle ECUs 3 at the set second transmission start position and then so as to transmit the probe data to the server 8 via the transceiver unit 114 and the wireless communication device 6. Also, the control unit associates a lane segment with the information of the probe data's transmission history and then store them in the storage unit 113. The processing of the control unit 112 corresponds to a control step.

The storage unit 113 stores the history information about the probe data transmission associated with the lane segment. The stored history information is referred to by the setting unit 111.

The transceiver unit 114 outputs, to the setting unit 111, the current lane segment information received from the car navigation unit 5. The transceiver unit also transmits, to the wireless communication device 6, the probe data inputted from the control unit 112. The processing of the transceiver unit 114 corresponds to a reception step or a transmission step.

In the above description, it has been explained that the setting unit 111 transmits the transmission interval distance and the offset to the control unit 112, and the control unit 112 sets the second transmission start position. However, the setting unit 111 may set the second transmission start position using the transmission interval distance and the offset and then transmit the set second transmission start position to the control unit 112. The above is the description of the functional configuration of the information transmission control device 1.

Figure 5:
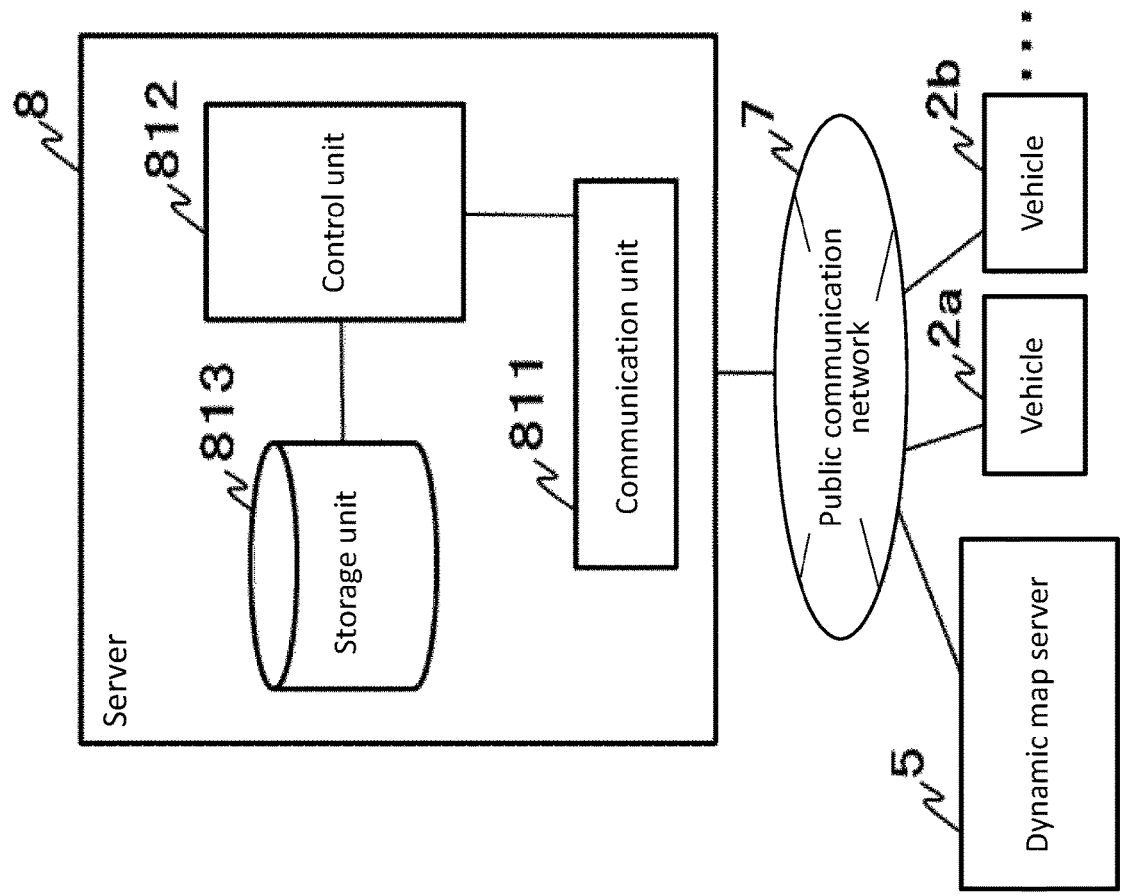
FIG. 5 is a functional configuration diagram of the server 8 according to Embodiment 1 of the present disclosure.

Next, the functional configuration of the server 8 will be described. FIG. 5 is a functional configuration diagram of the server 8 according to Embodiment 1 of the present disclosure. FIG. 5 shows that the server 8 includes: a communication unit 811 which communicates with the vehicle 2; a control unit 812 which controls so as to associate the probe data transmitted from the vehicle 2 with the information of the current lane segment at which the probe data was transmitted and to record them; and a storage unit 813 which stores the probe data. The CPU 803 reads out and executes a program stored in the ROM 801 in FIG. 3 to perform the processing of the control unit 812. The communication interface 806 performs the processing of the communication unit 811. The storage unit 813 corresponds to the RAM 802.

Next, the components of the server 8 will be described individually. The communication unit 811 transmits information to and receives information from the vehicle 2 via the public communication network 7. The control unit 812 associates the probe data transmitted from the vehicle 2 with the current lane segment information transmitted therefrom to store them in the storage unit 813. The storage unit 813 stores the probe data associated with the current lane segment information.

Figure 6:
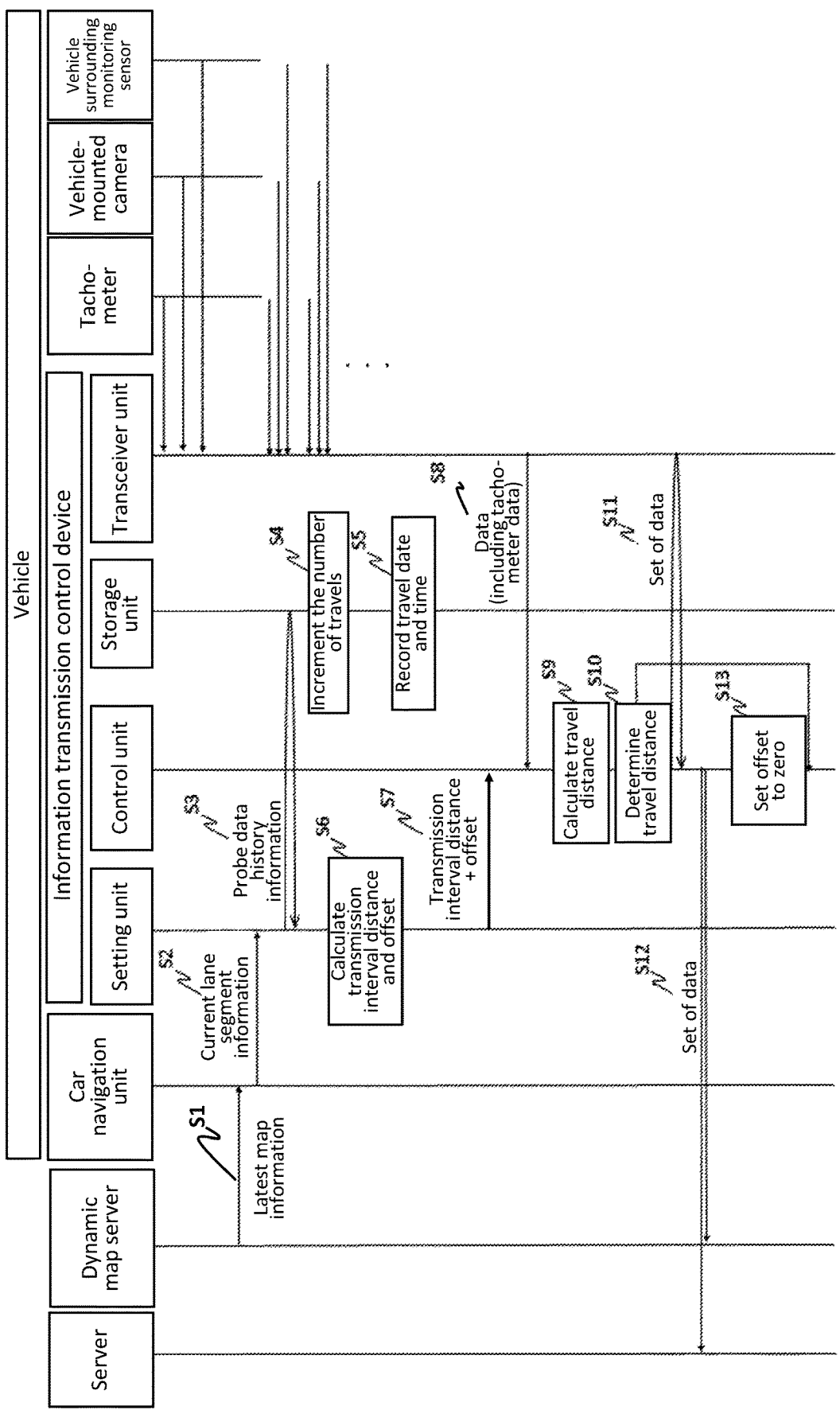
FIG. 6 is a sequence diagram showing the operation of the information transmission control device 1 according to Embodiment 1 of the present disclosure.

Next, the operation of the information transmission control device 1 will be described. FIG. 6 is a sequence diagram showing the operation of the information transmission control device 1 according to Embodiment 1 of the present disclosure. The car navigation unit 5 of the vehicle 2 obtains the latest map information including lane information and congestion information from the dynamic map server 9 in Step 1 (S1; hereinafter, "Step" is abbreviated to "S"). Then, the car navigation unit 5 determines a travel route, and transmits the current lane segment information to the transceiver unit 114 of the information transmission control device 1. The transceiver unit 114 outputs the current lane segment information received from the car navigation unit 5 to the setting unit 111 (S2).

Then, from the storage unit 113, the setting unit 111 obtains the history information of the probe data corresponding to the lane segment ID included in the current lane segment information (S3). At this time, the setting unit 111 increments the number of travels corresponding to the lane segment ID stored in the storage unit 113 (S4), and records the travel date and time (S5). Then, the setting unit sets a transmission interval distance and an offset using the history information of the probe data (S6), and outputs the set transmission interval distance and the set offset to the control unit 112 (S7). How to set the transmission interval distance and the offset will be described later.

In the transceiver unit 114, the data of the various sensors 4 is inputted from the in-vehicle ECUs 3. The sensors 4 include a tachometer, a vehicle-mounted camera, a vehicle's surroundings monitoring sensor, and the like. When the transmission interval distance and the offset are inputted from the setting unit 111, the control unit 112 uses the transmission interval distance and the offset to determine a second transmission start position for changing the transmission start position of the probe data. The control unit 112 obtains data received by the transceiver unit 114 (S8), and calculates a travel distance using the data from the tachometer being a sensor 4 (S9). Then, the control unit determines whether or not the travel distance has reached the distance from the head position of the current lane segment to the second transmission start position (S10).

When the travel distance reaches the distance from the head position of the current lane segment to the second transmission start position, the control unit 112 obtains a set of data of the various sensors 4 from the transceiver unit 114, and incorporates the obtained set of data into the probe data, to transmit it to the server 8 (S12). At this time, the control unit 112 also obtains GPS location information, and incorporates the GPS location information together with the current lane segment information into the probe data to transmit it to the server 8. The control unit 112 sometimes transmits, directly to the dynamic map server 9, data to be used for dynamic mapping such the vehicle-mounted camera data and the GPS location information. The server 8 records the probe data transmitted from the vehicle 2 in the storage unit 813.

Then, the control unit 112 of the information transmission control device 1 sets the offset to zero (S13); thereafter, the control unit determines, only on the basis of the transmission interval distance, the distance for transmitting the probe data to the server 8. In a case where the travel distance does not reach the distance for transmitting the probe data to the server 8, the process ends. After that, while the vehicle 2 is traveling, every time when the current lane segment information about the traveling vehicle is changed, the changed current lane segment information is transmitted from the car navigation unit 5 to the information transmission control device 1. Then, S2 and the steps succeeding it are performed. The above is the description of the operation of the information transmission control device 1.

Figure 7:
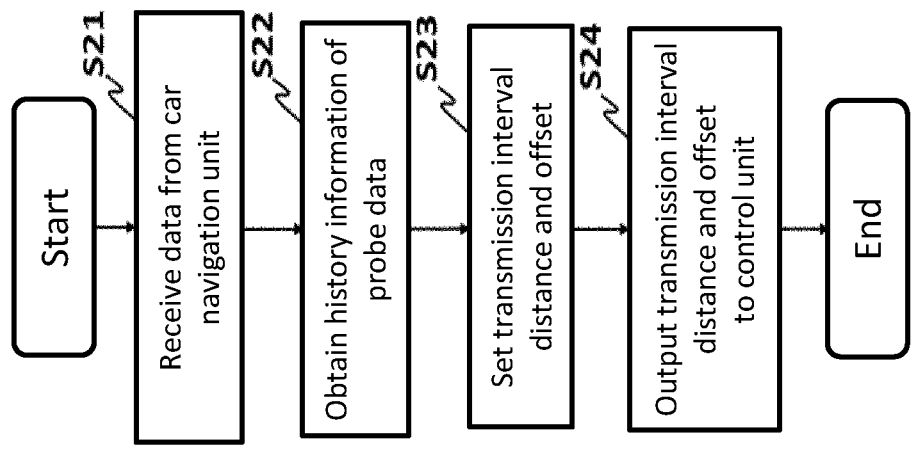
FIG. 7 is a flow chart showing the operation of a setting unit 111 of the information transmission control device 1 according to Embodiment 1 of the present disclosure.

Next, the operation of the setting unit 111 of the information transmission control device 1 will be described. FIG. 7 is a flow chart showing the operation of the setting unit 111 of the information transmission control device 1 according to Embodiment 1 of the present disclosure. The setting unit 111 of the information transmission control device 1 receives the data of the current lane segment information from the car navigation unit 5 via the transceiver unit 114

(S21). Then, the setting unit 111 obtains the history information of probe data corresponding to the lane segment ID of the current lane segment information from the storage unit 113 (S22). Then, the setting unit uses the obtained history information of the probe data, to set a transmission interval distance and an offset (S23). The setting method will be described later. Then, the setting unit outputs the set transmission interval distance and the set offset to the control unit 112 (S24).

Here, an example of how a transmission interval distance and an offset are set will be described. FIG. 8 shows setting examples of the transmission interval distance and the offset according to Embodiment 1 of the present disclosure. It is assumed, as shown in FIG. 8, that each piece of the history information of probe data consists of a lane segment ID, the last travel date and time, and the number of travels. For example, when obtaining the history information of probe data from the storage unit 113, if the lane segment ID of the current lane segment information of the vehicle 2 is "100010", the setting unit 111 obtains "2018/4/4" about the last travel date and time of the lane segment ID of "100010", and "231" about the number of travels thereof. Then, "the last travel date and time" is updated to the date and time of the current travel, and "the number of travels" is updated to 232 by adding 1. Also, it is assumed that with a reference transmission interval distance being set as "A" meters (for example, 10 meters), the transmission interval distance is determined on the basis of the time having elapsed from the last travel date and time to the current travel's date and time.

For example, as shown in FIG. 8, in a case when the time elapsed from the last travel's date and time to the current travel's date and time is less than seven days, it is determined that the transmission interval distance is "A"×10 meters; in a case when less than a year, "A"×2 meters; and in a case when a year or more, "A" meters. According to this setting, the larger the number of days have elapsed since the last travel's date and time, the shorter the transmission interval distance is set, to thereby set shorter intervals for the probe data to be transmitted. As shown in FIG. 8, random numbers corresponding to the number of travels are given to the offsets. For example, in a case where the number of travels=0, the offset is seven meters; and in a case where the number of travels=1, the offset is seventy meters. An example in which a random number table is used for setting offsets has been shown above. Instead, random numbers may be generated from the number of clocks since the engine started. In this way, the setting unit 111 sets a transmission interval distance and an offset using the history information of probe data corresponding to the current lane segment information, and outputs the set transmission interval distance and the set offset to the control unit 112. The transmission interval distance and the offset are set, using the history information of probe data corresponding to the current lane segment information such as the travelling information including the number of travels, the elapsed time since the last travel date and time, and a random number; thus, even for the same lane segment, the transmission interval distance and the offset are set to different values. Therefore, every time when the vehicle travels along the same lane segment, the road surface information can be obtained at different positions using the transmission interval distance and the offset. The above is the description of the operation of the setting unit 111.

Figure 9:
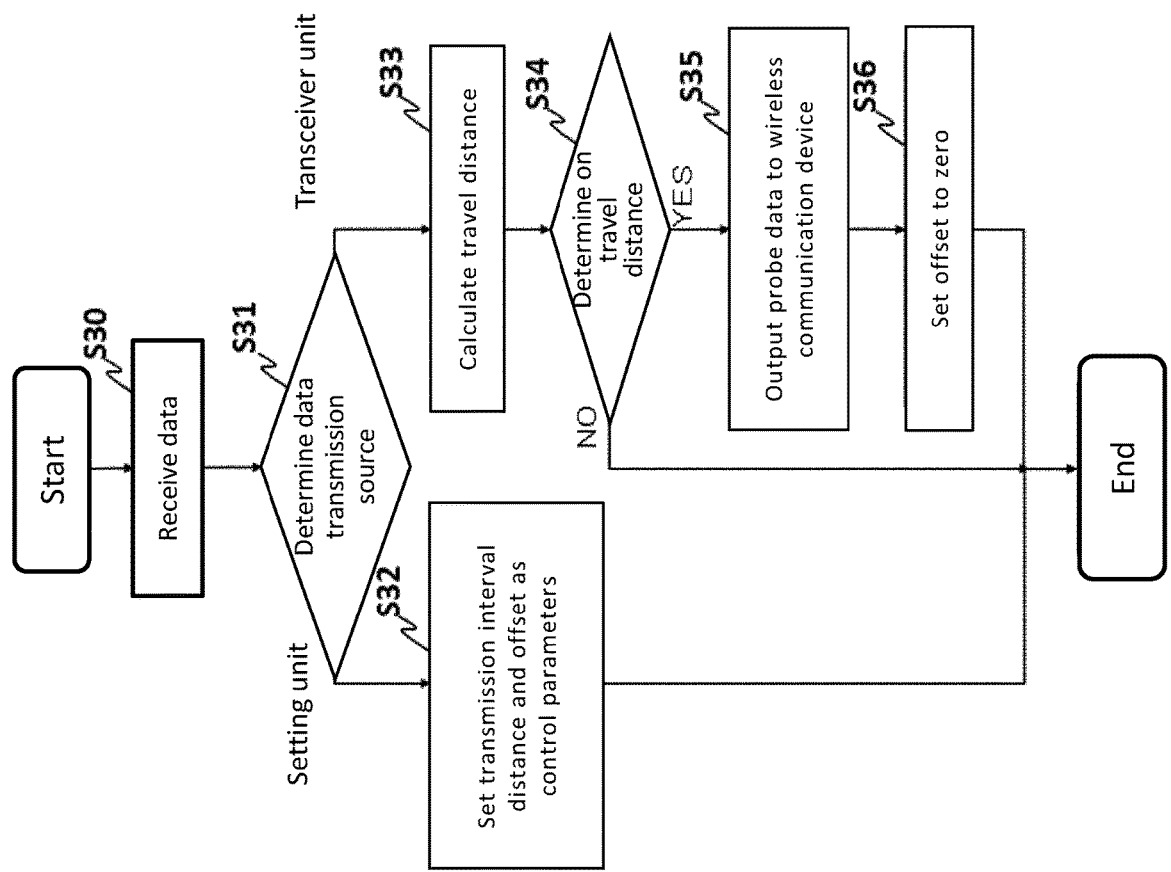
FIG. 9 is a flow chart showing the operation of a control unit 112 of the information transmission control device 1 according to Embodiment 1 of the present disclosure.

Next, the operation of the control unit 112 will be described. FIG. 9 is a flow chart showing the operation of the control unit 112 of the information transmission control device 1 according to Embodiment 1 of the present disclosure. The control unit 112 receives data from the setting unit 111 and the transceiver unit 114 (S30). Then, the control unit determines the transmission source of the received data (S31). The received data includes information on which source has transmitted the data. In a case where the control unit determines, at S31, that the data transmission source is the setting unit 111, the control unit sets the transmission interval distance inputted from the setting unit 111 and the offset inputted therefrom as control parameters (S32), and then ends the process. The control parameters are parameters for controlling the probe data transmission from the vehicle 2 to the server 8.

In a case where the control unit determines, at S31, that the data transmission source is the transceiver unit 114, the control unit calculates a travel distance of the vehicle from the tachometer data received from the transceiver unit 114 (S33). The information of an odometer may be used for calculating the travel distance. Then, the control unit determines whether or not the calculated travel distance is longer than a distance obtained by adding the offset value to the transmission interval distance (S34). The value obtained by adding the offset value to the transmission interval distance is a distance in a lane segment along which the vehicle is traveling, the distance being from the head position of the lane segment to a second transmission start position, to which a positon to start transmitting probe data is shifted.

In a case where the control unit determines, at S34, that the travel distance is the offset-value-added transmission interval distance or shorter, the control unit performs no processing, to end the process. In a case where the control unit determines, at S34, that the travel distance is longer than the offset-value-added transmission interval distance, the control unit obtains all probe data from the in-vehicle ECUs 3. At this time, the control unit also obtains GPS location information, to incorporate it and the current lane segment information into the probe data. Then, the control unit outputs the set of the obtained probe data to the wireless communication device 6 via the transceiver unit 114 (S35), to transmit it to the server 8 via the public communication network 7. Then, the control unit sets the value of the offset to zero (S36), and then ends the processing. If the control unit 112 does not receive data from the setting unit 111 after this processing, each time the control unit receives data from the transceiver unit 114, the control unit repeats the processing of S30, S31, and S33 and the steps following it. After the offset value is set to zero, the control unit performs the travel distance determination at S34 only on the basis of the transmission interval distance. The above is the description of the operation of the control unit 112.

Figure 10:
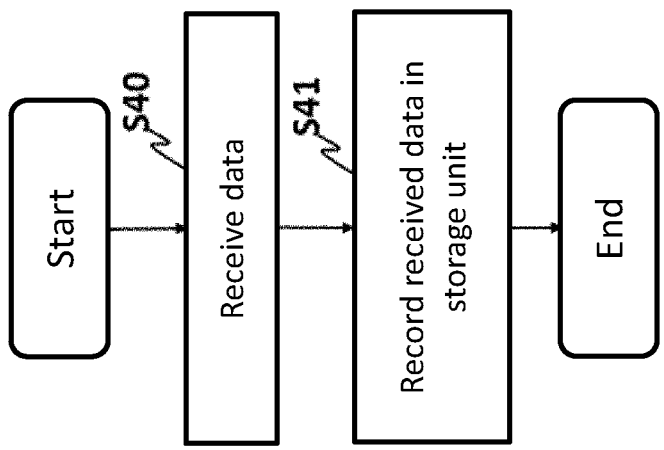
FIG. 10 is a flow chart showing the operation of the server 8 according to Embodiment 1 of the present disclosure.

Next, the operation of the server 8 will be described. FIG. 10 is a flow chart showing the operation of the server 8 according to Embodiment 1 of the present disclosure. The control unit 812 of the server 8 receives probe data from the vehicle 2 via the communication unit 811 (S40). Then, the control unit 812 associates the probe data with the information of the current lane segment at which the probe data is transmitted, to record them in the storage unit 813 (S41). The control unit 812 sometimes associates the probe data with the GPS location information, to store them.

In this way, the information transmission control device 1 sets a transmission interval distance and an offset using history information of probe data corresponding to the lane segment ID of the current lane segment information. Then, using the set transmission interval distance and the set offset, the information transmission control device changes, for each running unit, the position to start transmitting probe data. Therefore, the information transmission control device 1 does not transmit data multiple times at the same position while the vehicle stops, to thereby reduce its communication cost. The information transmission control device 1 uses the transmission interval distance and the offset to obtain road surface information at different positions every time when traveling on the same lane segment. This makes it possible to obtain the road surface information evenly at different positions along a running lane. Therefore, it is also possible to efficiently update a high-precision map even for a place which has little traffic on the road and has few opportunities to get update information from traveling vehicles. Also, when the functions of the present disclosure are provided for a general vehicle commuting along the same route every day or a business vehicle such as buses which travel the same route multiple times, it will bring a great advantage of evenly obtaining information on their travel routes.

Embodiment 2

In the example of Embodiment 1, the vehicle 2 sets a transmission interval distance and an offset using the history information of probe data stored in the vehicle and the current lane segment information; the vehicle 2 changes the probe data transmission start position, to transmit the probe data from the vehicle to the server 8. An example of Embodiment 2 will be described below; in the example, the server 8 sets a transmission interval distance and an offset using history information of probe data of a plurality of vehicles, the history information being stored in the server 8.

Figure 11:
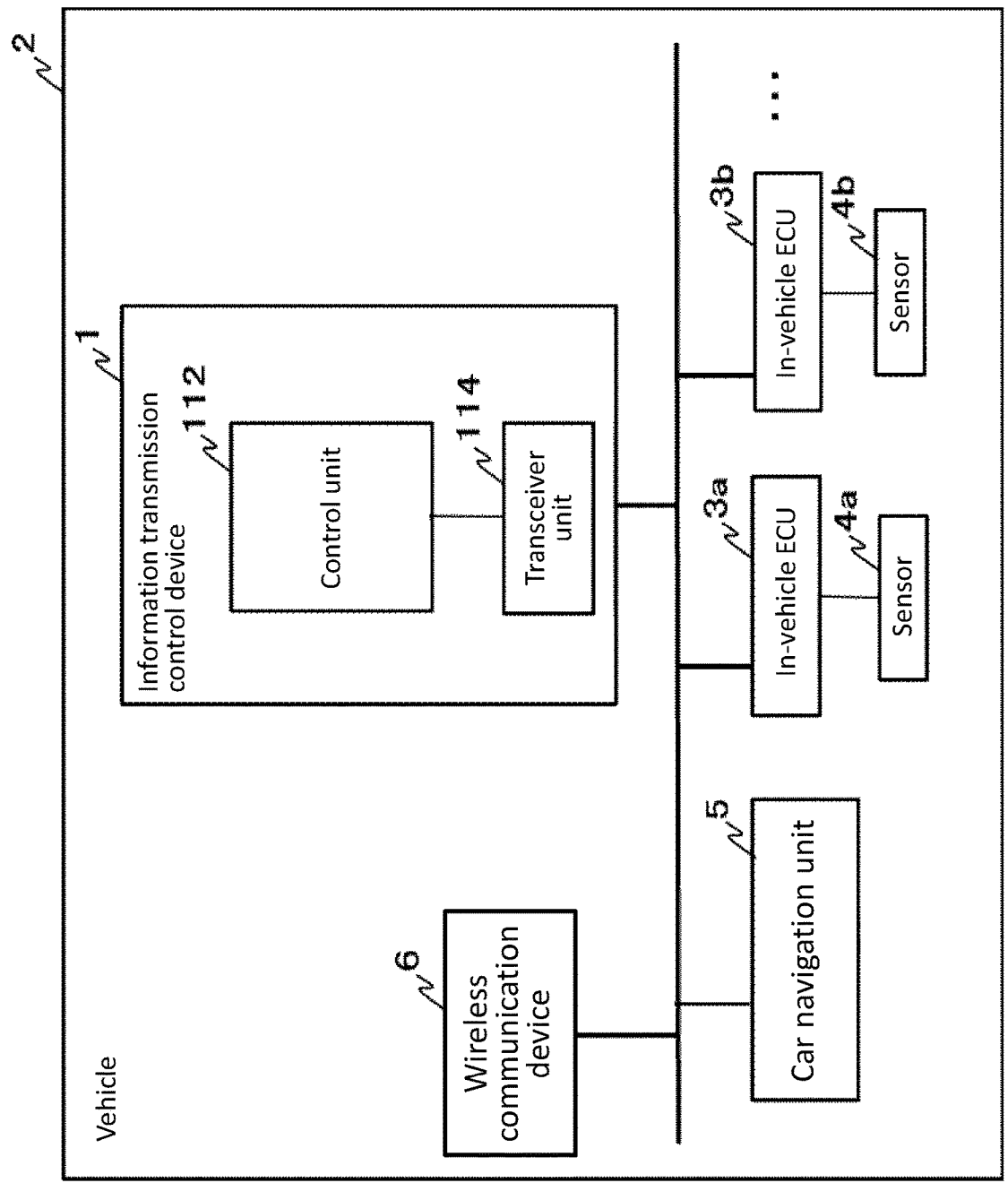
FIG. 11 is a functional configuration diagram of an information transmission control device 1 according to Embodiment 2 of the present disclosure.

Although the system configuration diagram of Embodiment 2 and the hardware configuration diagram thereof are the same as those of Embodiment 1, there exists a plurality of vehicles 2. As the functional configurations of the information transmission control device 1 and the server 8 are different from those of Embodiment 1, they will be described below. First, the functional configuration of the information transmission control device 1 will be described. FIG. 11 is a functional configuration diagram of the information transmission control device 1 according to Embodiment 2 of the present disclosure. The information transmission control device 1 includes a control unit 112 and a transceiver unit 114. In Embodiment 1, the setting unit 111 and the storage unit 113 are included; however, in Embodiment 2, these are not included. For the processing of the control unit 112, the CPU 103 reads out and executes a program stored in the ROM 101 in FIG. 2. The processing of the transceiver unit 114 is performed by the communication interface 106.

The transceiver unit 114 receives current lane segment information from a car navigation unit 5 and outputs the current lane segment information to the control unit 112 of the information transmission control device 1. The transceiver unit transmits, to the server 8, the current lane segment information outputted from the control unit 112. Also, the transceiver unit outputs, to the control unit 112, a transmission interval distance received from the server 8 and an offset received therefrom; the transceiver unit transmits probe data to the server 8 at a position controlled by the control unit 112. The processing of the transceiver unit 114 corresponds to a reception step and a transmission step. The control unit 112 receives current lane segment information from the car navigation unit 5 via the transceiver unit 114, and transmits the current lane segment information to the server 8 via the transceiver unit 114. When receiving the transmission interval distance and the offset from the server 8 via the transceiver unit 114, the control unit shifts the transmission start position, to transmit the probe data to the server 8. This processing of the control unit 112 corresponds to a control step performed by the vehicle 2. The above is the description of the functional configuration of the information transmission control device 1.

Figure 12:
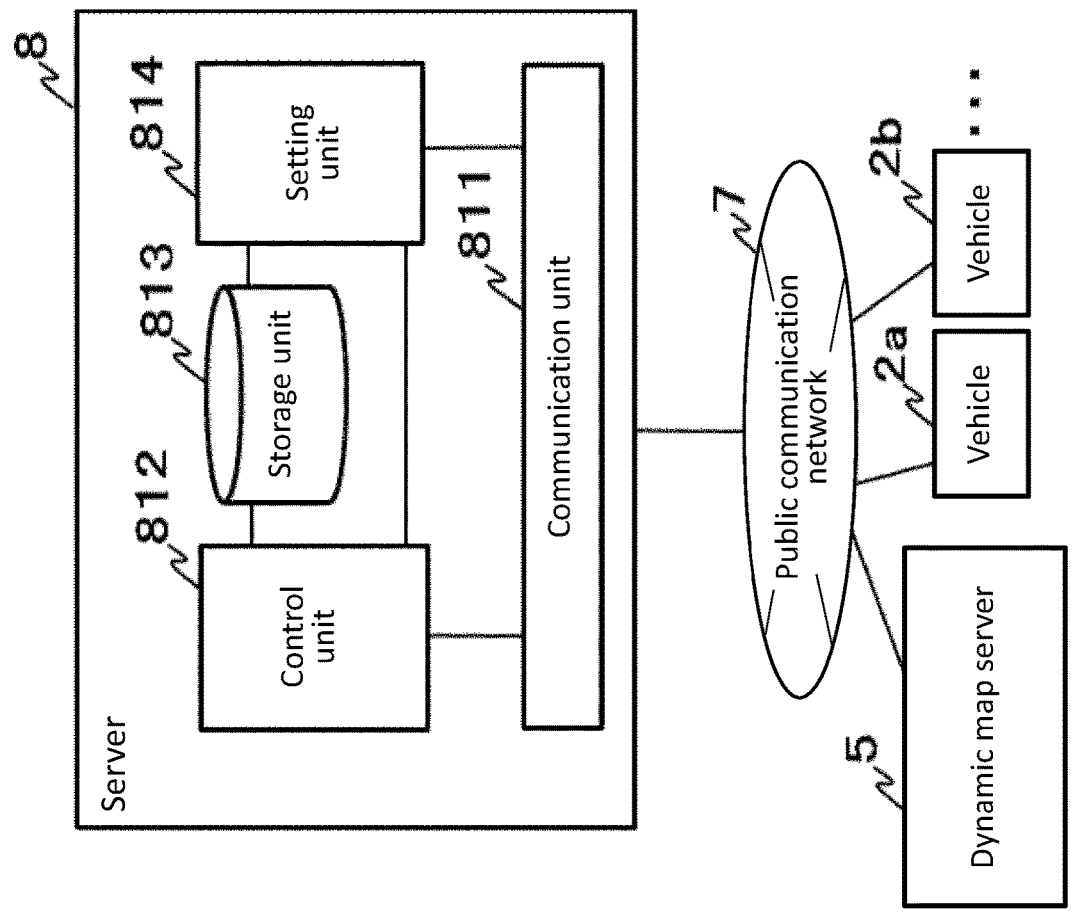
FIG. 12 is a functional configuration diagram of a server 8 according to Embodiment 2 of the present disclosure.

Next, the functional configuration of the server 8 will be described. FIG. 12 is a functional configuration diagram of the server 8 according to Embodiment 2 of the present disclosure. The server 8 includes a communication unit 811, a control unit 812, a storage unit 813, and a setting unit 814. In Embodiment 2, in addition to the probe data itself, the information on probe data transmission history is also stored in the storage unit 813. The setting unit 814 sets a transmission interval distance and an offset for changing the probe data transmission start position, and transmits them to a vehicle 2. For the processing performed by the control unit 812 and the setting unit 814, the CPU 803 reads out and executes a program stored in the ROM 801 shown in FIG. 3. The processing of the communication unit 811 is performed by the communication interface 806. The storage unit 813 corresponds to the RAM 802.

The communication unit 811 outputs current lane segment information received from the vehicle 2 to the setting unit 814. A transmission interval distance and an offset which were set by the setting unit 814 are transmitted to the vehicle 2. The probe data received from the vehicle 2 is also outputted to the control unit 812. The processing of the communication unit 811 corresponds to a communication step. When receiving probe data from a vehicle 2 via the communication unit 811, the control unit 812 associates the received probe data with the information of the current lane segment at which the probe data was transmitted, and then make the storage unit 813 store them. The processing of the control unit 812 corresponds to a control step performed by the server 8. The probe data received from vehicles 2 is associated with their lane segment information and stored in the storage unit 813. Further, the storage unit 813 stores history information about transmitting probe data of the vehicles 2. The setting unit 814 uses the current lane segment information received from a vehicle 2 and the history information stored in the storage unit 813, to set a transmission interval distance and an offset for the vehicle 2 that has transmitted the current lane segment information and then transmit the transmission interval distance and the offset set for the vehicle 2. This processing of the setting unit 814 corresponds to a setting step performed by the server 8. The above is the description of the functional configuration of the server 8.

Figure 13:
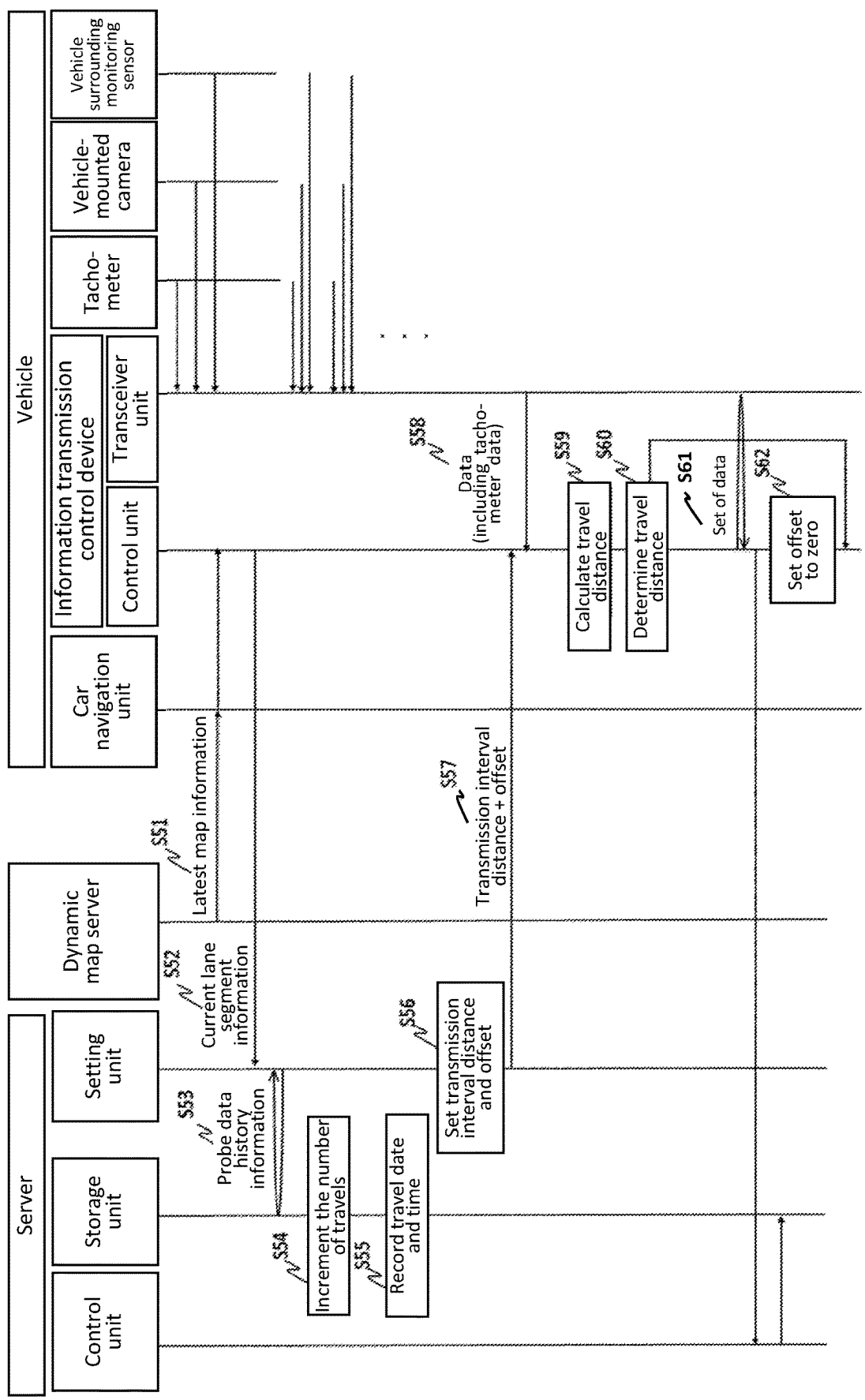
FIG. 13 is a sequence diagram showing the operation of the information transmission control device 1 according to Embodiment 2 of the present disclosure.

Next, the operation of the information transmission control device 1 will be described. FIG. 13 is a sequence diagram showing the operation of the information transmission control device 1 according to Embodiment 2 of the present disclosure. The car navigation unit 5 of a vehicle 2 obtains, from the dynamic map server 9, the latest map information including lane information and traffic congestion information (S51). Then, the car navigation unit 5 determines a travel route and transmits the current lane segment information to the control unit 112 via the transceiver unit 114 of the information transmission control device 1. Then, the control unit 112 transmits the current lane segment information to the setting unit 814 of the server 8 via the transceiver unit 114 (S52).

Then, the setting unit 814 of the server 8 obtains, from the storage unit 813 of the server 8, the history information of probe data corresponding to the lane segment ID of the current lane segment information (S53). At this time, the setting unit 814 increments the number of travels which is stored in the storage unit 813 and corresponds to the lane segment ID (S54), and the setting unit records the travel date and time (S55). Then, the setting unit sets a transmission interval distance and an offset using the history information of the probe data (S56), and then outputs the set transmission interval distance and the set offset to the control unit 112 of the vehicle 2 (S57).

In the transceiver unit 114 of a vehicle 2, the data of various sensors 4 is inputted from the in-vehicle ECUs 3. The sensors 4 include, for example, a tachometer, a vehicle-mounted camera, and a vehicle's surroundings monitoring sensor. When receiving the transmission interval distance and the offset from the server 8, the control unit 112 of the vehicle 2 uses the transmission interval distance and the offset, to determine a second transmission start position for changing the probe-data transmission start position. The control unit 112 obtains the data inputted to the transceiver unit 114 (S58), and calculates a distance using the data of the tachometer (S59). Then, the control unit 112 determines whether or not the travel distance has reached the distance from the head position of the lane segment to the second transmission start position (S60).

When the travel distance reaches the distance from the head position of the current lane segment to the second transmission start position, the control unit 112 obtains a set of data of the various sensors 4 from the transceiver unit 114, and incorporates the obtained set of data into the probe data, to transmit it to the server 8 (S61). The server 8 records the probe data transmitted from the vehicle 2. Then, the control unit 112 sets the offset to zero (S62); thereafter, the control unit determines, only on the basis of the transmission interval distance, the distance for transmitting probe data to the server 8. In a case where the travel distance does not reach the distance for transmitting the probe data to the server 8, the process ends.

Next, the operation of the server 8 will be described. The setting unit 814 of the server 8 receives current lane segment information from the information transmission control devices 1 of vehicles 2 via the communication unit 811. The control unit 812 also receives probe data from the information transmission control devices 1 of the vehicles 2.

Figure 14:
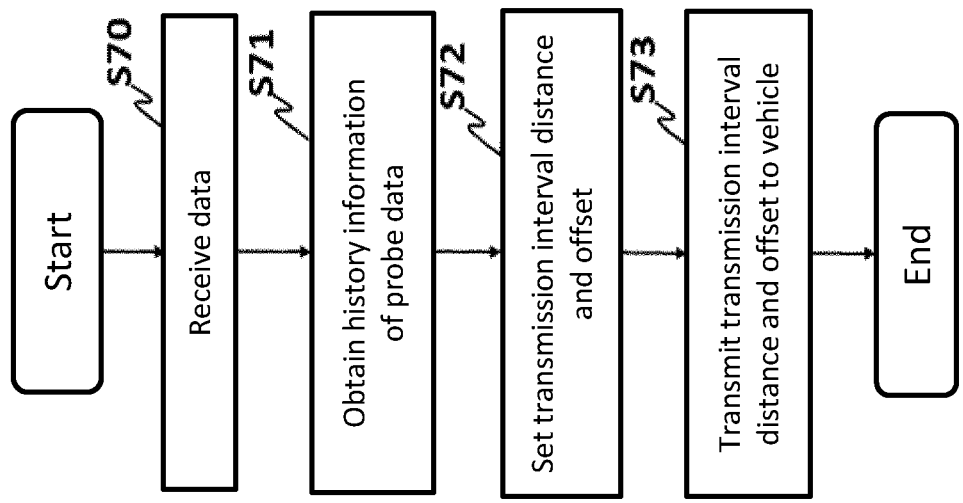
FIG. 14 is a flow chart showing the operation of a setting unit 814 of the server 8 according to Embodiment 2 of the present disclosure.

Next, the operation of the setting unit 814 of the server 8 will be described. FIG. 14 is a flow chart showing the operation of the setting unit 814 of the server 8 according to Embodiment 2 of the present disclosure. The setting unit 814 receives the data of the current lane segment information from a vehicle 2 via the communication unit 811 (S70). Then, the setting unit 814 obtains, from the storage unit 813, the history information of probe data corresponding to the lane segment ID of the received current lane segment information (S71).

Next, the setting unit sets a transmission interval distance and an offset on the basis of the history information of probe data corresponding to the current lane segment information (S72). The setting criterion is the same as that in Embodiment 1. Then, the setting unit transmits the set transmission interval distance and the set offset to the vehicle 2 via the communication unit 811 (S73), and ends the process. The above describes the operation of the setting unit 814 of the server 8. In a case where there is no information of probe data history because, for example, it is the first time to travel the route, initial settings for the transmission interval distance and the offset are transmitted to the vehicle 2.

Figure 15:
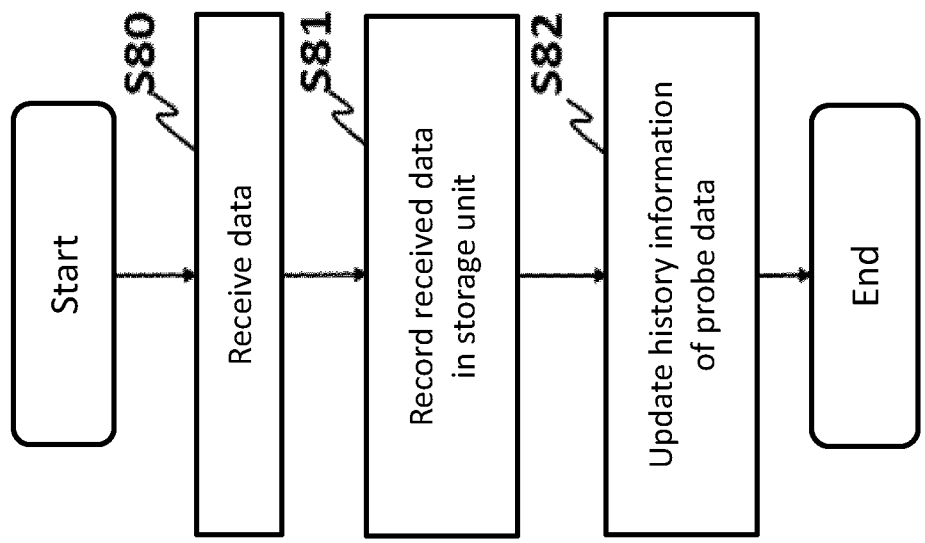
FIG. 15 is a flow chart showing the operation of a control unit 812 of the server 8 according to Embodiment 2 of the present disclosure.

Next, the operation of the control unit 812 of the server 8 will be described. FIG. 15 is a flow chart showing the operation of the control unit 812 of the server 8 according to Embodiment 2 of the present disclosure. The control unit 812 receives probe data from a vehicle 2 via the communication unit 811 (S80). Then, the control unit 812 associates the received probe data with the current lane segment information, to record them in the storage unit 813 (S81). The control unit 812 also updates the history information about vehicles' 2 having transmitted probe data (the information about the last travel date and time corresponding to the lane segment ID and about the number of travels corresponding thereto) (S82). The history information of probe data is also recorded in the storage unit 813. A plurality of vehicles 2 transmits their probe data to the server 8. Thus, each time the probe data is transmitted thereto, the control unit updates the last travel date and time corresponding to the lane segment ID and the number of travels corresponding thereto. The above is the description of the operation of the control unit 812 of the server 8.

Figure 16:
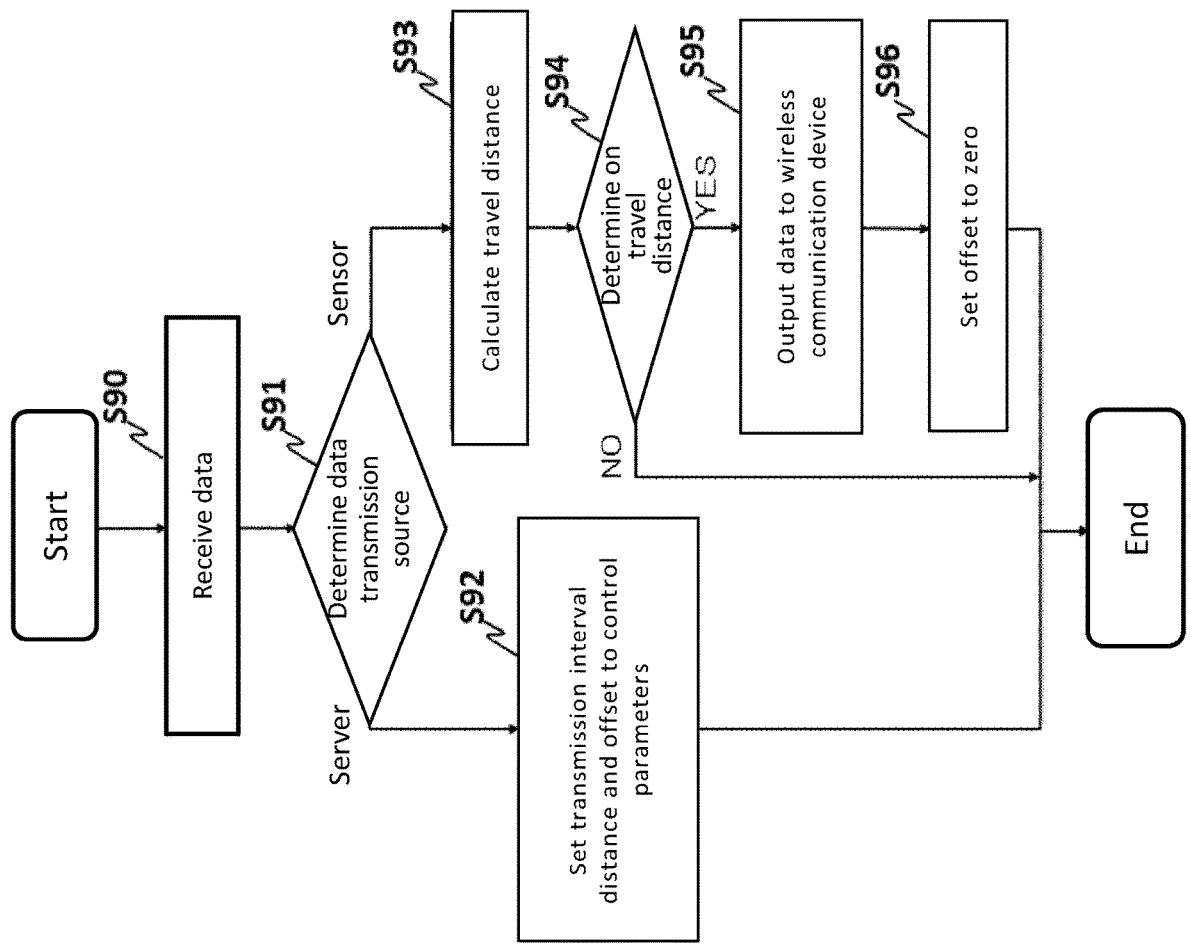
FIG. 16 is a flow chart showing the operation of a control unit 112 of the information transmission control device 1 according to Embodiment 2 of the present disclosure.

Next, the operation of the information transmission control device 1 of a vehicle 2 will be described. FIG. 16 is a flow chart showing the operation of the control unit 112 of the information transmission control device 1 according to Embodiment 2 of the present disclosure. The control unit 112 of the information transmission control device 1 receives data from the server 8 and the sensors 4 of the in-vehicle ECUs 3 (S90). The data includes information on the transmission source. Next, the control unit 112 determines the transmission source of the received data (S91). In a case where the control unit determines, at S91, that the transmission source of the data is the server 8, the control unit sets the transmission interval distance received from the server 8 and the offset received therefrom to control parameters (S92), and then the control unit ends the process. In a case where the control unit determines, at S91, that the data transmission sources are the sensors 4, the control unit calculates a travel distance using the data of the sensor 4 being a tachometer (S93).

Then, the control unit determines whether or not the travel distance has reached the distance for transmitting probe data to the server 8, in other words, whether or not the travel distance has reached the distance from the head position of the current lane segment to the second transmission start position (S94). When the travel distance reaches the distance for transmitting probe data to the server 8, the control unit obtains the set of data of the various sensors 4, which is to be inputted from the transceiver unit 114, and then incorporates the obtained set of data with the probe data, to transmit them to the server 8 via the wireless communication device 6 (S95). The server 8 records the transmitted probe data in the storage unit 813. Then, the control unit 112 of the vehicle 2 sets the offset to zero (S96); thereafter, the distance for transmitting probe data to the server 8 is determined only on the basis of the transmission interval distance. If the travel distance does not reach the distance for transmitting probe data to the server 8, the control unit ends the process.

As described above, the server 8 uses the history information of a plurality of vehicles to set a transmission interval distance and an offset; the vehicles 2 change the probe-data transmission start positions on the basis of the set transmission interval distance and the set offset. Therefore, the server 8 can obtain information at positions on a road more efficiently and evenly than that of Embodiment 1. Because the server 8 sets the transmission interval distance and the offset value, the components of the vehicle 2 can be reduced; furthermore, the number of operations in the information transmission control device 1 of the vehicle 2 can be reduced.

INDUSTRIAL APPLICABILITY

As described above, the information transmission control device according to the present disclosure sets a transmission interval distance and an offset using the current lane segment information and the history information about probe data transmissions, and changes the probe-data transmission start position using the set transmission interval distance and the set offset, whereby road surface information can be obtained evenly and efficiently at positions of the lane.

DESCRIPTION OF SYMBOLS

1: information transmission control device, 2: vehicle, 3: in-vehicle ECU, 4: sensor, 5: car navigation unit,
6: wireless communication device, 7: public communication network, 8: server, 9: dynamic map server,
101: ROM, 102: RAM, 103: CPU, 104: microcomputer,
105: non-volatile memory, 106: communication interface, 111: setting unit, 112: control unit, 113: storage unit, 114: transceiver unit,
801: ROM, 802: RAM, 803: CPU, 804: microcomputer,
805: non-volatile memory, 806: communication interface, 811: communication unit, 812: control unit, 813: storage unit, 814: setting unit

The invention claimed is:

1. An information transmission control device comprising:
a transceiver to receive current lane segment information including specific information of a lane segment of a lane for a vehicle to travel along and a distance thereof from a head position of the lane segment;
a controller to control transmission of probe data by setting a second transmission start position, on the basis of a transmission interval distance showing a transmission interval represented in terms of travel distance for transmitting probe data from the vehicle to a server and on the basis of an offset corresponding to a distance for changing a first transmission start position being a position to start transmitting the probe data to the server, the transmission interval distance and the offset being set using the current lane segment information and history information about probe data transmission from the vehicle to the server;
a storage to store the history information; and
setting circuitry to set the transmission interval distance and the offset using the current lane segment information and the history information stored in the storage,
wherein the controller sets the second transmission start position using the transmission interval distance and the offset set by the setting circuitry.

2. An information transmission control device comprising:
a transceiver to receive current lane segment information including specific information of a lane segment of a lane for a vehicle to travel along and a distance thereof from a head position of the lane segment; and
a controller to control transmission of probe data by setting a second transmission start position, on the basis of a transmission interval distance showing a transmission interval represented in terms of travel distance for transmitting probe data from the vehicle to a server and on the basis of an offset corresponding to a distance for changing a first transmission start position being a position to start transmitting the probe data to the server, the transmission interval distance and the offset being set using the current lane segment information and history information about probe data transmission from the vehicle to the server,
wherein the history information about a plurality of vehicles is stored in a storage of the server, and
wherein the controller transmits the current lane segment information to the server, receives from the server the transmission interval distance and the offset which are set using the current lane segment information and the history information stored in the server, and sets the second transmission start position.

3. The information transmission control device according to claim 1, wherein the transmission interval distance is set according to time elapsed from date and time when the vehicle traveled along the lane segment last time, and the offset is set according to a number of times that the vehicle has traveled along the lane segment.

4. The information transmission control device according to claim 2, wherein the transmission interval distance is set according to time elapsed from date and time when the vehicle traveled along the lane segment last time, and the offset is set according to a number of times that the vehicle has traveled along the lane segment.

5. A server comprising:
communication circuitry to transmit information to and receive information from a vehicle;
a storage to store probe data transmitted from the vehicle in association with a lane segment at which the probe data is transmitted, and to store history information about probe data transmission;
setting circuitry which uses current lane segment information including specific information of a lane segment of a lane for the vehicle to travel along and a distance thereof from a head position of the lane segment and uses history information about the vehicle's having transmitted probe data to the server, to set a transmission interval distance showing the probe-data's transmission interval represented in terms of travel distance and an offset corresponding to a distance for changing a first transmission start position being a position to start transmitting probe data to the server, and then transmit the transmission interval distance and the offset to the vehicle; and
a controller to make the storage store, in association with the current lane segment information, the probe data transmitted from the vehicle at a second transmission start position set on the basis of the transmission interval distance and the offset.

6. An information transmission control system comprising:
a transceiver to receive current lane segment information including specific information of a lane segment for a vehicle to travel along and a distance thereof from a head position of the lane segment;
a storage to store information about probe data transmission history;
setting circuitry which uses the current lane segment information and the history, information, to set a transmission interval distance showing the probe data's transmission interval represented in terms of travel distance, and an offset corresponding to a distance for changing a first transmission start position being a position to start transmitting probe data to a server; and
a controller to control transmission of the probe data to the server after setting a second transmission start, position using the set transmission interval distance and the set offset.

7. An information transmission control system comprising:
   a server; and
   an information transmission control device including
      a transceiver to receive current lane segment information including specific information of a lane segment of a lane for a vehicle to travel along and a distance thereof from a head position of the lane segment,
      a first storage to store information about probe data transmission history,
      setting circuitry which uses the current lane segment information and the history information, to set a transmission interval distance showing the probe data's transmission interval represented in terms of travel distance and an offset corresponding to a distance for changing a first transmission start position being a position to start transmitting probe data to the server, and
      a first controller to control transmission of the probe data to the server after setting a second transmission start position using the set transmission interval distance and the set offset,
   the server including
      communication circuitry to transmit information to and receive information from the vehicle,
      a second storage to store the probe data transmitted from the vehicle in association with a lane segment at which the probe data is transmitted, and
      a second controller to make the second storage store the probe data transmitted from the vehicle in association with the current lane segment information.

8. An information transmission control system comprising:
   a server; and
   an information transmission control device including
      a transceiver to receive current lane segment information including specific information of a lane segment of a lane for a vehicle to travel along and a distance thereof from a head position of the lane segment; and
      a first controller to control transmission of the current lane segment information to the server, and to control transmission of the probe data to the server after setting a second transmission start position using a transmission interval distance received from the server showing a transmission interval represented in terms of travel distance for transmitting probe data, and using an offset received from the server in which the offset corresponds to a distance for changing a first transmission start position being a position to start transmitting the probe data to the server,
   the server including
      communication circuitry to transmit information to and receive information from the vehicle,
      a storage to store the probe data transmitted from the vehicle in association with the lane segment at which the probe data is transmitted and history information about the probe data transmission,
      setting circuitry to set, using the current lane segment information received from the vehicle and the history information received therefrom, the transmission interval distance and the offset and to transmit the set transmission interval distance and the set offset to the vehicle, and
      a second controller to make the storage store the probe data transmitted from the vehicle in association with the current lane segment information.

\* \* \* \* \*